Nov. 24, 1953 A. S. PAGE 2,660,451
MEANS FOR REDUCING TORSIONAL STRAIN ON VEHICLE AXLES
Filed Feb. 12, 1952 3 Sheets-Sheet 1

INVENTOR.
ANCEL S. PAGE
BY
ATTORNEY

Nov. 24, 1953 A. S. PAGE 2,660,451
MEANS FOR REDUCING TORSIONAL STRAIN ON VEHICLE AXLES
Filed Feb. 12, 1952 3 Sheets-Sheet 2

INVENTOR.
ANCEL S PAGE
BY
ATTORNEY

Nov. 24, 1953 A. S. PAGE 2,660,451
MEANS FOR REDUCING TORSIONAL STRAIN ON VEHICLE AXLES
Filed Feb. 12, 1952 3 Sheets-Sheet 3
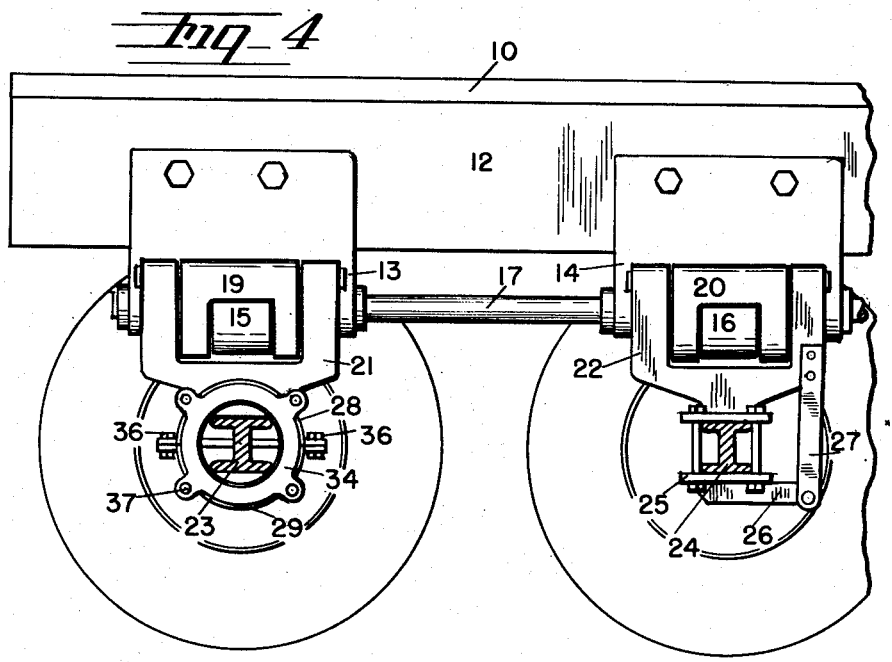
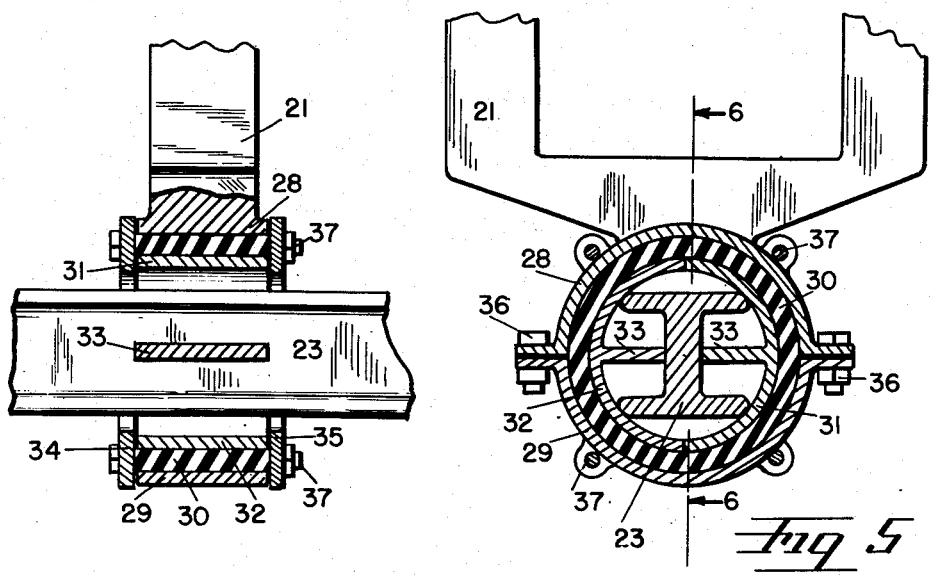
INVENTOR.
ANCEL S PAGE
BY
ATTORNEY Patented Nov. 24, 1953

2,660,451

UNITED STATES PATENT OFFICE 2,660,451

MEANS FOR REDUCING TORSIONAL STRAIN ON VEHICLE AXLES

Ancel S. Page, Portland, Oreg.

Application February 12, 1952, Serial No. 271,095

5 Claims. (Cl. 280—104.5)

The present invention is concerned with the problem of reducing the torsional strain to which vehicle axles are subjected in certain types of vehicle suspensions and under certain conditions. More specifically this invention relates to the torsional strain imposed upon axles of dual axle vehicles under certain conditions which take place in vehicle suspensions where spring walking beams and other types of spring mountings for the axle are not employed and thus in which there is no ordinary spring means capable of absorbing or reducing the torsional strain to which the axles may be subjected. In particular this invention relates to that particular type of dual axle vehicle suspension in which torsion spring rods take the place of all the ordinary springs in the suspension.

Torsional strain on the axle, such as that above referred to, takes place when the mountings in which the axle is secured at opposite sides of the vehicle are forced to move or to rotate in relatively opposite directions, or are forced to rotate to a different extent in the same direction, in their respective substantially vertical planes. Under such conditions, if the axle is firmly secured in its mountings at opposite sides of the vehicle, a torsional strain is necessarily imposed upon the axle between the mountings. Not infrequently such torsional strains eventually result in axle failure.

An object of the present invention is to provide an improved axle mounting in which such torsional strain on the axle will be absorbed or reduced to such extent as to prevent any damage occurring to the axle from such cause.

A more specific object of the invention is to provide an improved axle mounting suitable for use particularly in dual axle vehicle suspensions in which torsional spring rods take the place of leaf springs or coil springs in cushioning or reducing the shocks transmitted from the wheels and axles to the vehicle frame.

An additional object of the invention is to provide means for reducing the torsional strain on vehicle axles which means will be simple and practical and in the use of which means no special maintenance problem will be involved.

The manner in which these objects are attained, the nature and causes of the torsional strain on axles which constitute the problem to the solution of which the invention is directed, and the manner in which the means for reducing such torsional strain is constructed and arranged in accordance with my invention, will be explained in the following brief description with reference to the accompanying drawings.

In the drawings:

Fig. 4 is a corresponding elevation on line 4—4 of Fig. 1;

Fig. 5 is a fragmentary section on line 5—5 of Fig. 2, drawn to a larger scale;

Fig. 6 is a section corresponding to line 6—6 of Fig. 5; and

Fig. 7 is a fragmentary perspective view of the rear axle and wheels in the vehicle suspension of Fig. 1, illustrating the position of wheels, axle and vehicle frame under a particular condition, the near side wheels and near side spindle end of the axle being broken away for clarity.

Figure 1:
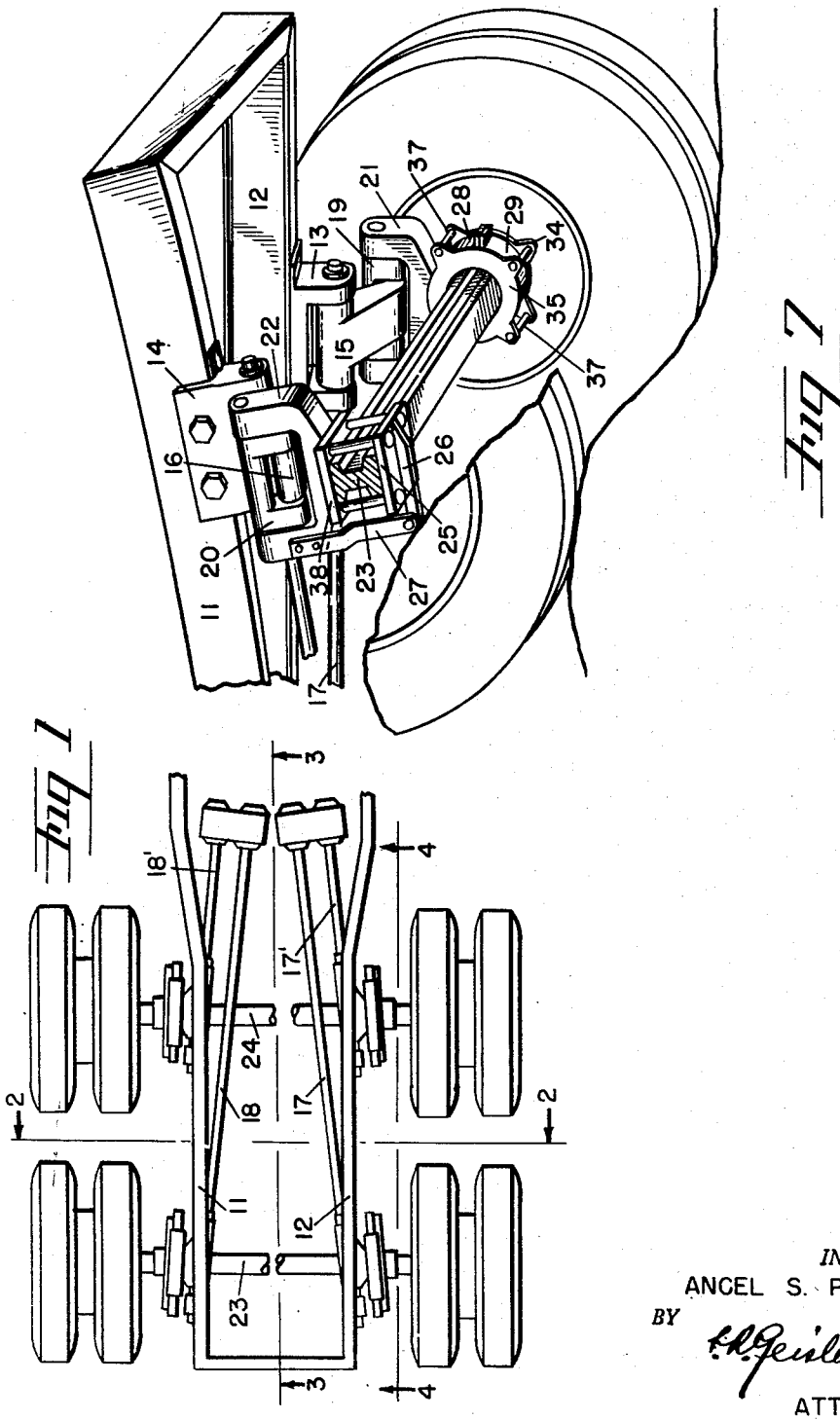
Fig. 1 is a diagrammatic plan view of a wheel suspension in the rear portion of a dual axle vehicle, in which vehicle torsion spring rods are employed in place of walking beams and springs, and with which suspension my invention is employed.

Referring first to Fig. 1 and also to Figs. 2, 3, 4 and 7, the vehicle frame includes the main longitudinal frame members 11 and 12 to which the wheel suspensions are connected and on top of which the platform deck 10 (Figs. 2, 3 and 4) is mounted.

The two wheel axles 23 and 24 are connected with the longitudinal frame members 11 and 12 by pairs of hinge assemblies, and since these hinge assemblies are similar it will suffice for the present to describe the hinge assemblies connected to the rear axle 23.

Figure 2:
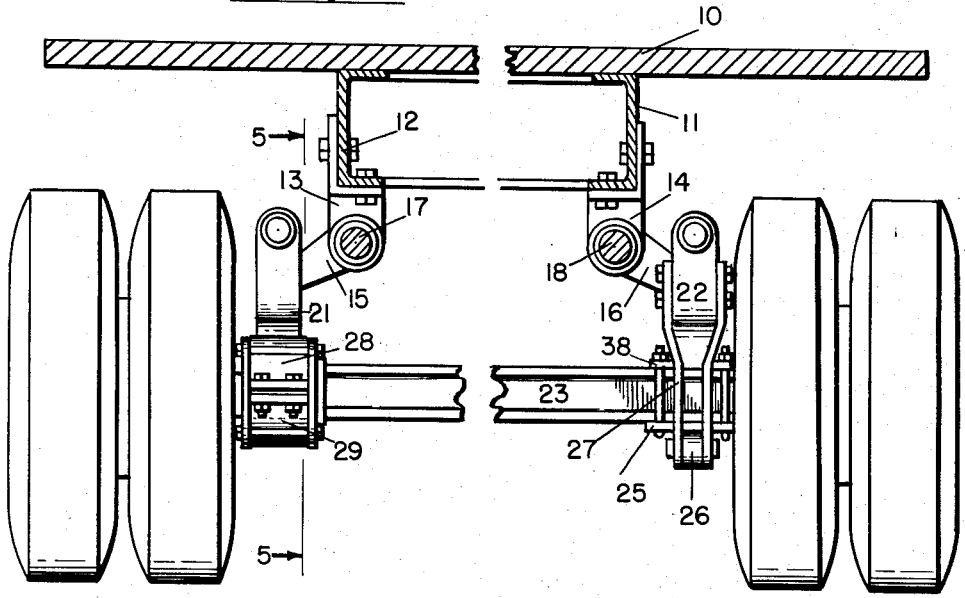
Fig. 2 is a transverse vertical section on line 2—2 of Fig. 1 drawn to a larger scale.

Referring to Figs. 2, 4 and 7, the hinge assembly connecting one end portion of the axle 23 with the longitudinal frame member 12 includes a frame bracket 13, which is bolted or welded to frame member 12, a hinge arm 15 pivotally mounted in the frame bracket 13, an upstanding axle bracket 21 mounted on the axle 23, and a link 19 connecting axle bracket 21 and hinge arm 15. The hinge assembly connecting the other end portion of the axle 23 and the other longitudinal frame member 11 (Figs. 2, 3 and 7) comprises the frame bracket 14, rigidly secured to frame member 11, a hinge arm 16 pivotally mounted in frame bracket 14, an axle bracket 22 mounted on the axle 23, and a link 20 connecting bracket axle 22 and hinge arm 16. A torsion spring rod 17 has one end securely mounted in the hinge shaft by which the hinge arm 15 is connected to the bracket 13. A similar torsion spring rod 18 is similarly secured in the hinge shaft by which the hinge arm 16 is connected to the bracket 14. A second pair of corresponding torsion spring rods 17' and 18' (Fig. 1) are similarly secured to the hinge arm assemblies by which the forward axle 24 is connected with the frame members 11 and 12. Meshing gears (not shown) connect the forward ends of the pairs of torsion rods 17, 17' and 18, 18', thus dividing the loads on both sides of the vehicle between the two axles or two sets of wheel assemblies and operating to cushion and reduce the shocks and vertical motion transmitted to the vehicle frame from the wheels and axles. The vehicle suspension thus far described is well known and consequently a more detailed description of the action of the torsion spring rods is unnecessary as these torsion spring rods do not constitute any part of the present invention.

When a wheel, in a vehicle suspension of this type, is raised considerably above the level on which the other wheels are traveling, causing the immediate portion of the vehicle frame to be raised, a slight amount of bending of the frame momentarily takes place. This will be understood from the illustration in Fig. 7. It will be noted that the lifting of one of the wheels momentarily forces the raised frame member 11 out of parallelism with the opposite frame member 12. However, since the bracket 14 is rigidly secured to frame member 11 while bracket 13 is rigidly secured to frame member 12, it will be apparent, in the absence of undesirable play in the toggle hinge assemblies, that the movement of one longitudinal frame member 11 out of parallelism with the opposite longitudinal frame member 12 must result in some torsional twisting strain of the axle 23 if this axle 23 is rigidly secured to the respective hinge assemblies at both sides of the vehicle. This will explain why such torsional strains occur in this manner and why such strains heretofore have presented a problem, particularly in this type of vehicle suspension, and why failures of axles have resulted from such conditions.

Instead of clamping both end portions of the axle 23 rigidly to the respective axle brackets 21 and 22, I provide one of the axle brackets (thus the axle bracket 21 of Figs. 2, 4 and 7) with a rubber bushing surrounding the axle and provide an outer bushing housing secured to the bracket, and include means for exerting the desired compression of the rubber bushing. This arrangement of the bushing and its mounting is shown most clearly in Figs. 5 and 6.

Referring now to Figs. 5 and 6, the axle 23, which is shown in the form of an I-beam, but which of course may be of any desired cross sectional shape, has welded to it an inner bushing housing consistitng of two semi-cylindrical sections 31 and 32. Preferably each of these semi-cylindrical sections is formed with a reinforcing middle rib 33, and the inner edges of these middle ribs 33 are also welded to the respective sides of the axle when the housing sections 31 and 32 are welded in place together on the axle. A cylindrical rubber housing 30 is then placed over the inner housing sections 31, 32. The bottom of the end of axle bracket 21 is formed with a semi-cylindrical outer housing section 28 to which a companion lower semi-cylindrical outer housing section 29 is adapted to be clamped. These outer housing sections 28 and 29 have radially extending flanges at their adjacent edges through which clamping bolts 36 extend.

A pair of annular end plates 34 and 35 extend over the opposite ends of the rubber bushing 30 and over the ends of the inner and outer bushing housings, and these end plates 34 and 35 have extending ears through which the clamping bolts 37 extend. Thus the clamping bolts 36 cause radial compression to be exerted on the rubber bushing 30 and the clamping bolts 37 produce longitudinal or axial compression of the bushing 30. As will be readily understood from Fig. 5, the rubber bushing 30 makes it possible for the bracket 21 and axle 23 to be rotated slightly with respect to each other.

The opposite end portion of axle 23 is rigidly clamped to its bracket 22 (Figs. 2, 3 and 7), and held against rotation with respect to bracket 22. The bracket 22 is formed with an integral clamping plate 38 which rests on top of the axle 23 and which is connected by clamping bolts to a companion lower clamping plate 25 which is clamped against the bottom face of the axle 23.

Thus one end portion of the axle 23 is held against any rotation with respect to the bracket 22, and consequently with respect to the toggle hinge assembly connected with the longitudinal main frame member 11, while the other end portion of the axle 23 may rotate slightly with respect to bracket 21 and the toggle hinge assembly connected with the other longitudinal main frame member 12. As a result, the moving of the main frame members 11 and 12 slightly out of parallelism with each other, as may be occasioned when the vehicle passes over a bump in the roadway on one side or the other, as previously mentioned, does not produce any actual torsional twisting of the axle.

Figure 3:
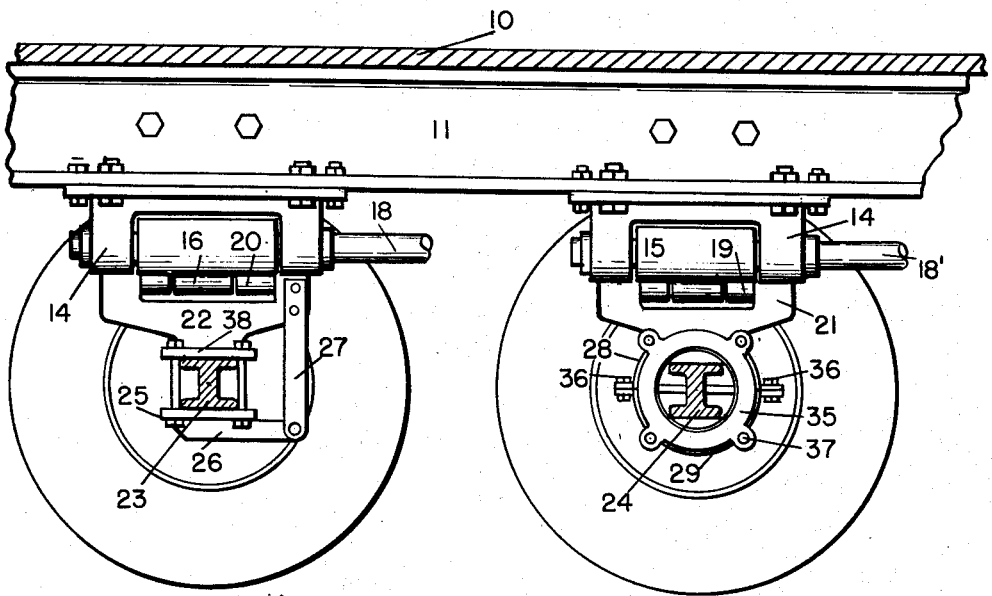
Fig. 3 is a vertical longitudinal section on line 3—3 of Fig. 1 drawn to the same enlarged scale.

Inasmuch as, with my improvement and means for reducing the torsional strain on the axle, the clamping hold on the axle 23 which prevents the axle from rotating under brake torque, is exerted almost entirely by the bracket 22 as described, and inasmuch as the tendency for the axle to rotate under brake torque when the brakes are applied to the wheels will generally be in the direction of the wheel rotation when the vehicle is moving forwardly or in normal direction, I prefer to reinforce the clamping hold of bracket 22 on the axle 23 by providing an additional bottom arm 26 (Fig. 3), rigidly secured to the bottom clamping plate 25 and extending forwardly from the clamping plate 25, and then attaching the forward end of this reinforcing bottom arm 26, by means of a link 27, to the upper forward portion of bracket 22, as shown clearly in Fig. 3. This construction acts as an additional brace for the clamping means by which the axle 23 is secured to the bracket 22.

The second axle 24 of the dual axle vehicle suspension is connection with the longitudinal frame members 11 and 12 in the same manner as axle 23 previously described except that I consider it preferable to reverse the relative location of the rubber bushing with the second axle and thus have the rubber bushing carried by the toggle hinge assembly connecting the axle 24 with the longitudinal frame member 11 and having the rigid clamping of the axle 24 positioned in the toggle hinge assembly connected with the longitudinal frame member 12, as indicated in Figs. 3 and 4. While this particular arrangement is not absolutely necessary, nevertheless I have found that the placing of the rubber bushing on one side for one axle and on the opposite side for the other axle of the dual axle vehicle suspension makes for a better balanced vehicle suspension and in the long run equalizes the stresses on both of the longitudinal main frame members 11 and 12. The details of the hinge assemblies with which the second axle 24 is connected with the main frame members 11 and 12 are identical to those already described for axle 23, as will be apparent from Figs. 3 and 4, and consequently further description of my invention with respect to the second axle 24 of the vehicle suspension is unnecessary.

Thus, with my invention, in the dual axle vehicle suspension described, torsional strain on both axles is reduced and actual twisting of the axles is prevented. Both axles, however, are firmly held against any rotation produced by braking torque, and there is no interference with the operation and functioning of the torsion spring rods.

Minor modifications would of course be possible in the details of construction of the axle brackets, in the clamping means by which one such bracket is clamped to each axle, and in the bushing housings and mounting of the other bracket of each pair with which each axle is connected with the vehicle frame, without departing from the principle of my invention.

The particular construction of these members as described and illustrated I have found to be very satisfactory and practical and therefore I regard the same as a preferred embodiment of my invention, but without any intention to limit my invention otherwise than as set forth in the claims.

I claim:

1. In a vehicle suspension, a pair of longitudinally-extending frame members located respectively at opposite sides of the vehicle and normally parallel to each other, a vehicle axle, a pair of hinge assemblies connecting said axle with said members respectively, the hinge shafts in said assemblies being parallel to the frame members respectively with which said hinge assemblies are connected, an axle bracket in each hinge assembly, one of said brackets having means rigidly securing the end portion of said axle to the bracket, an upper section of a cylindrical bushing housing rigidly attached to the other bracket, the axis of said bushing housing section located in a plane normal to the plane of the hinge of said bracket, a lower corresponding complementary portion for said upper bushing housing section, adjustable clamping means securing said lower portion to said upper section respectively, a bushing of resilient compressible material in said bushing housing, the other end portion of said axle extending through said bushing, said clamping means enabling said bushing to be compressed radially, a pair of annular plates positioned at opposite ends of said bushing housing respectively and engaging the respective ends of said bushing, and tie bolts connecting said pair of annular members to enable said bushing to be compressed longitudinally, whereby said axle by being rigidly held against rotation in one of said brackets, while capable of slight rotation in the other of said brackets, will be protected from torsional twist when said frame members are temporarily moved out of parallelism.

2. In a vehicle suspension, a pair of longitudinally-extending frame members located respectively at opposite sides of the vehicle and normally parallel to each other, a vehicle axle, a pair of hinge assemblies connecting said axle with said members respectively, the hinge shafts in said assemblies being parallel to the frame members respectively with which said hinge assemblies are connected, an axle bracket in each hinge assembly, one of said brackets having means rigidly securing the end portion of said axle to the bracket, said means including top and bottom clamping plates connected together by clampingbolts, an arm extending forwardly from the bottom clamping plate, and a securing link connecting the forward end of said arm with the upper portion of the bracket, a bushing housing attached to the other bracket, a rubber bushing in said bushing housing, said bushing and bushing housing extending around the other end portion of said axle, and means for compressing said bushing, whereby said axle by being rigidly held against rotation in one of said brackets, while capable of slight rotation in the other of said brackets, will be protected from torsional twist when said frame members are temporarily moved out of parallelism.

3. In a vehicle suspension of the character described, a pair of longitudinally-extending frame members located respectively at opposite sides of the vehicle and normally parallel to each other, a pair of vehicle axles, a pair of hinge assemblies connecting each of said axles with said members respectively, the hinge shafts in said assemblies being parallel to the frame members respectively with which said hinge assemblies are connected, an axle bracket in each hinge assembly, one of said brackets in each pair of assemblies having means rigidly securing the bracket to the end portion of the axle with which it is connected, an upper section of a cylindrical bushing housing rigidly attached to each of the other brackets, the axis of each of said bushing housing sections located in a plane normal to the plane of the hinge of the respective bracket, a lower corresponding complementary portion for each upper bushing housing section, adjustable clamping means securing said lower portions to said upper sections respectively, a bushing of resilient compressible material in each bushing housing, the other end portions of said axles extending through said bushings respectively, said clamping means enabling said bushings to be compressed radially, a pair of annular plates positioned at opposite ends of each of said bushing housings respectively and engaging the respective ends of said bushings, and tie bolts connecting each pair of annular members to enable said bushings to be compressed longitudinally, whereby each of said axles by being rigidly held against rotation in one of its brackets, while capable of slight rotation in the other of said brackets, will be protected from torsional twist when said frame members are temporarily moved out of parallelism.

4. A vehicle suspension of the character described including a pair of longitudinally-extending frame members located respectively at opposite sides of the vehicle and normally parallel to each pair, a pair of vehicle axles, a pair of hinge assemblies connecting each of said axles with said members respectively, the hinge shafts in said assemblies being parallel to the frame members respectively with which said hinge assemblies are connected, an axle bracket in each hinge assembly, one of said brackets in each pair of assemblies having means rigidly securing the bracket to the end portion of the axle with which it is connected, said rigidly-secured brackets located at opposite sides of the vehicle respectively, an upper semi-cylindrical portion of a bushing housing rigidly attached to each of the other brackets, the axis of each of said bushing housing portions located in a plane normal to the plane of the hinge of the respective bracket, a lower corresponding complementary portion for each upper bushing housing portion, adjustable clamping bolts securing said lower portions to said upper portions respectively, a bushing of resilient compressible material in each bushing housing, the other end portions of said axles extending through said bushings respectively, said clamping bolts enabling said bushings to be compressed radially, a pair of annular plates positioned at opposite ends of each of said bushing housing respectively and engaging the respective ends of said bushings, and tie bolts connecting each pair of annular members to enable said bushings to be compressed longitudinally, whereby each of said axles by being rigidly held against rotation in one of its brackets, while capable of slight rotation in the other of said brackets, will be protected from torsional twist when said frame members are temporarily moved out of parallelism.

5. A vehicle suspension of the character described comprising a pair of longitudinally-extending frame members located respectively at opposite sides of the vehicle and normally parallel to each other, a pair of vehicle axles, a pair of hinge assemblies connecting each of said axles with said members respectively, the hinge shafts in said assemblies being parallel to the frame members respectively with which said hinge assemblies are connected, an axle bracket in each hinge assembly, one of said brackets in each pair of assemblies having means rigidly securing the bracket to the end portion of the axle with which it is connected, said rigidly-secured brackets located at opposite sides of the vehicle respectively, said means including top and bottom clamping plates connected together by clamping bolts, an arm extending forwardly from the bottom clamping plate, and a securing link connecting the forward end of said arm with the upper portion of the bracket, a bushing housing attached to each of the other brackets, a rubber bushing in each bushing housing, said bushings and bushing housings extending around the other end portions of said axles respectively, and means for compressing said bushings, whereby each of said axles by being rigidly held against rotation in one of its brackets, while capable of slight rotation in the other of said brackets, will be protected from torsional twist when said frame members are temporarily moved out of parallelism.

ANCEL S. PAGE.

References Cited in the file of this patent
UNITED STATES PATENTS

| Number | Name | Date |
| --- | --- | --- |
| 2,371,602 | Benz | Mar. 20, 1945 |
| 2,567,481 | Hickman | Sept. 11, 1951 |